United States Patent
Prentice (12)

(10) Patent No.: US 6,731,797 B2
(45) Date of Patent: May 4, 2004

(54) COLOR DEPENDENT LUMINANCE PROCESSING

(75) Inventor: Wayne E. Prentice, Honeoye Falls, NY (US)

(73) Assignee: Eastman Kodak Company, Rochester, NY (US)

(*) Notice: Subject to any disclaimer, the term of this patent is extended or adjusted under 35 U.S.C. 154(b) by 581 days.

(21) Appl. No.: 09/808,285

(22) Filed: Mar. 14, 2001

(65) Prior Publication Data

US 2002/0159631 A1 Oct. 31, 2002

(51) Int. Cl.$^7$ ................................. G06K 9/00
(52) U.S. Cl. ........................................ 382/167
(58) Field of Search ................... 382/162, 167, 382/260, 274; 358/515, 520

(56) References Cited

U.S. PATENT DOCUMENTS

| | | | | |
|---|---|---|---|---|
| RE34,169 E | * | 1/1993 | Osburn et al. ............. | 358/520 |
| 5,218,350 A | * | 6/1993 | Bollman .................... | 345/619 |
| 6,438,264 B1 | * | 8/2002 | Gallagher et al. .......... | 382/167 |

* cited by examiner

Primary Examiner—Phuoc Tran
(74) Attorney, Agent, or Firm—David M. Woods

(57) ABSTRACT

A method and structure for developing a photographic image from a camera, filtering the image, and developing the image. Filtering of an image entails separating the image into a luminance channel and chrominance channels, alternating the luminance channel by saturation and hue to produce the altered luminance channel and recombining the chrominance channels and the altered luminance channel. The hue controls the color of filtering and the saturation controls the strength of the filtering. Prior to separating and converting the linear exposure is converted to a logarithmic space. This conversion of linear exposure to logarithmic space allows the luminance's channel to be altered independently from the chrominance channels. The alteration creates a filtered RGB to YCrCb matrix and applying the matrix to the logarithmic space produces a filtered logarithmic space. The invention recombines the YCrCb to RGB matrix to the filtered logarithmic space.

25 Claims, 4 Drawing Sheets

COLOR DEPENDENT LUMINANCE PROCESSING

BACKGROUND OF THE INVENTION

1. Field of the Invention

The invention relates generally to the field of digital image processing and more particularly to luminance processing that is based upon color dependence.

2. Description of the Related Art

Color filters are used in black and white photography to modify contrast in the captured image. For example, yellow filters are used in outdoor black and white photography to darken the sky and reduce haze. However, when the same filters are applied to color photography an undesirable yellow color cast can result.

Further, the filters used in photography are conventionally applied to the image globally. In other words, a certain color (or combination color) filter is applied to the entire image. While the filter may change one portion of the image in a desired fashion, there is a possibility that another portion of the image will be adversely affected. Therefore, conventional filters always present a trade-off between desirable and undesirable effects. The invention overcomes these problems as discussed below.

SUMMARY OF THE INVENTION

The invention includes a method for developing a photographic image from a digitized color image by filtering the image and developing the image. Filtering of the image entails separating the image into a luminance channel and chrominance channels, altering the luminance channel by modifying the red, green and blue coefficients used to generate the luminance channel based upon a filter color to produce the altered luminance channel and recombining the chrominance channels and the altered luminance channel. The hue controls the color of filtering and the saturation controls the strength of the filtering. Prior to separating and converting the linear exposure is converted to a logarithmic space. This conversion of linear exposure to logarithmic space allows the luminance's channel to be altered independently from the chrominance channels. The alteration creates a filtered RGB to YCrCb matrix and applying the matrix to the logarithmic space produces a filtered logarithmic space. The invention returns to the RGB space by applying the YCrCb to RGB matrix to the filtered logarithmic space.

Alternatively, the system for developing a photographic image includes a filter applied to the image, a divider adapted to separate the image into luminance and chrominance channels, a saturation control and a hue control adapted to alter the luminance channel and to produce an altered luminance channel, and an adder adapted to recombine the chrominance channels and the altered luminance channel. The hue control changes the color of the filter and the saturation control changes the strength of the filter. Further, a converter is adapted to convert the image into a linear exposure and the linear exposure to a logarithmic space. The converter allows the luminance channel to be altered independently from the chrominance channels. The saturation input and the hue input produce a filtered RGB to YCrCb matrix and the invention applies the matrix to a logarithmic space to produce a filtered logarithmic space. The adder applies YCrCb to RGB matrix to the filtered logarithmic space.

ADVANTAGES OF THE INVENTION

With the invention, color filters can be synthesized for a digitized color image and applied to the image to modify the contrast without imparting a color cast. Further, the invention allows unrenderable portions of the image that are too bright or too dark to be modified based upon chrominance so as to bring the unrenderable portions into a mid-tone range and make them renderable.

Using the invention, the filter applied (e.g., the calculation of the luminance channel) could optionally be a function of the color coordinates described by the chrominance, the pixel's location in the image, the proximity to other colors/hues, or results from other image analysis/image understanding algorithms. Thus, the invention allows different filters to be selectively applied to different portions of the image. For example, the calculation of blue regions may suppress blue to darken a blue sky, while a flesh tone region may use a different filter to alter contrast differently in those regions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention achieves the foregoing advantages by converting an image from red-green-blue (RGB) space into luminance and chrominance space, filtering (based upon color) the luminance channel, and returning the image to RGB space, to allow different color filters to be selectively applied to an image. Typically, the luminance channel is created from a linear combination of the red, green and blue channels in a way that mimics the photopic efficiency function. However, with the invention, the luminance channel is created from a combination (linear or non-linear) of red, green and blue as though they pass through a color filter, so as to achieve the desired luminance contrast. This new luminance channel is then re-combined with the chrominance channels and converted back to RGB.

An optical color filter selectively attenuates the luminance of the image based upon wavelength of light reflected from an object. Theoretically, any region or combination of regions of the color spectrum can be attenuated. This invention operates on image data after it has been sampled into red, green and blue signals. As a result, specifying the filter by it spectral attenuation is not practical. The filter instead is specified by the enhancement or attenuation of the red, green or blue signal. A number of methods could be used to specify these combinations: independent red, green and blue gains; a hue and saturation values, to mention a couple. The later (hue and saturation) are chosen for the preferred embodiment since only two degrees of freedom exist when specifying a synthetic filter, which is ultimately converted to red, green and blue gains. Independent gains for the three colors channels could be defined, however the gain factors are constrained such that they sum to one so as not to alter the average image luminance. It is possible however to convert a filter specified by its spectral attenuation into an approximation using red, green and blue gains with knowledge of the spectral properties of the image taking system.

Figure 1:
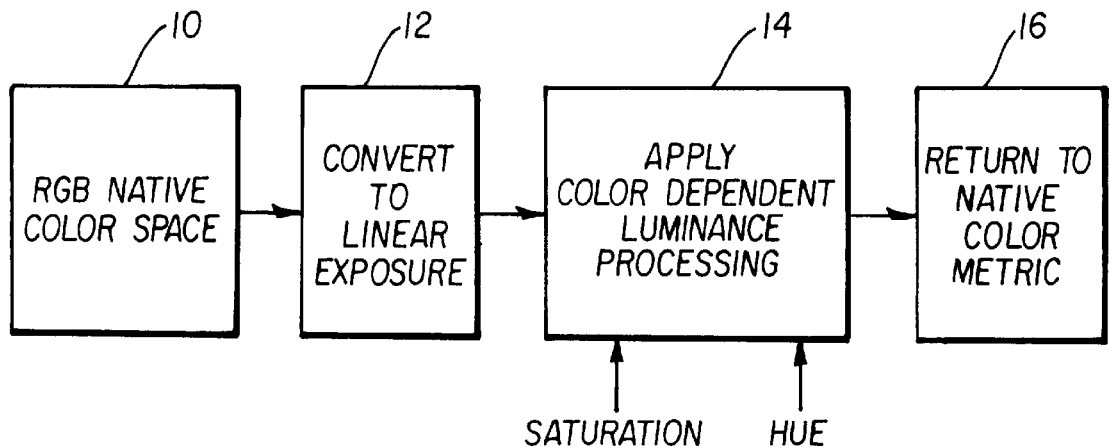
FIG. 1 is a schematic flow diagram of one embodiment of the invention.

This process is shown in flowchart form in FIG. 1. More specifically, in item 10 the invention begins with the RGB native color space that is camera specific. The invention converts the RGB native color space to a generic linear exposure in item 12. Then, the invention applies the color dependent luminance processing with controlled saturation and hue in item 14. The luminance processing 14 is shown in greater detail in FIG. 2, discussed below. Finally, in item 16, the invention returns the image to the native color metric.

As mentioned above, it is common in black and white photography to use a yellow filter for outdoor photography. The yellow filter has the effect of darkening the sky and reducing haze. The invention utilizes the luminance processing 14 to achieve the same result without producing an undesirable yellow color cast. More specifically, the invention creates a matrix that converts the image RGB data to a luminance, chrominance-red, chrominance-blue (Y, Cr, Cb) color space.

Figure 2:
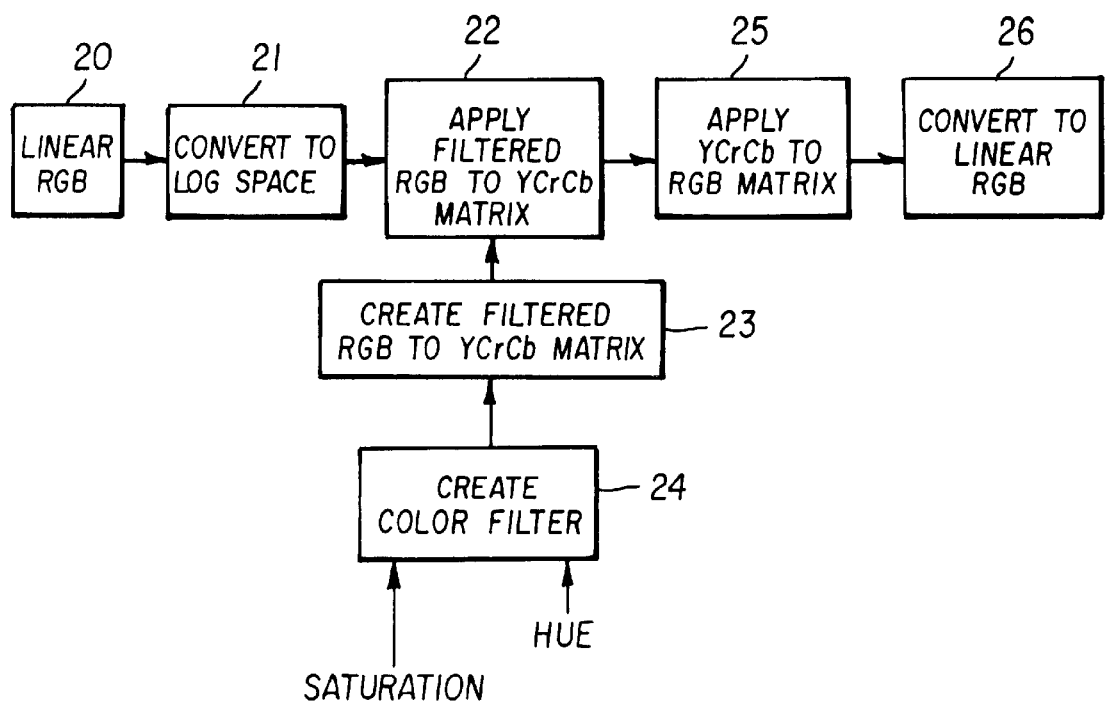
FIG. 2 is a schematic flow diagram of one embodiment of the invention.

The invention is not limited to an RGB color space and the invention uses a log exposure space to create chrominance channels that are independent of luminance. This is illustrated in FIG. 2, where the linear RGB 20 from item 12 above is converted to logarithmic space 21. As shown in item 24, two user adjustable controls are used to create the inventive "filter". One is a saturation control (Sat), the other a hue angle control (Hue). The saturation control can be thought of as the "strength" or color bandwidth control. When Sat equals zero, no filter is applied. The hue control selects the region for the color spectrum from which the filter is created (e.g., the color of the filter).

Once the user has established the desired filter color and filter strength settings (e.g., Sat and Hue), the invention creates a filtered RGB to YCrCb matrix, as shown in item 23 and applies the matrix to the log space image 21 in item 22. The invention then converts the filtered image back to RGB space by applying a conventional YCrCb to RGB conversion matrix, as shown in item 25. Finally, in item 26 the data is converted back to the same space as the input data: linear RGB. From this point, the data can then be returned back to its native metric.

Figure 3:
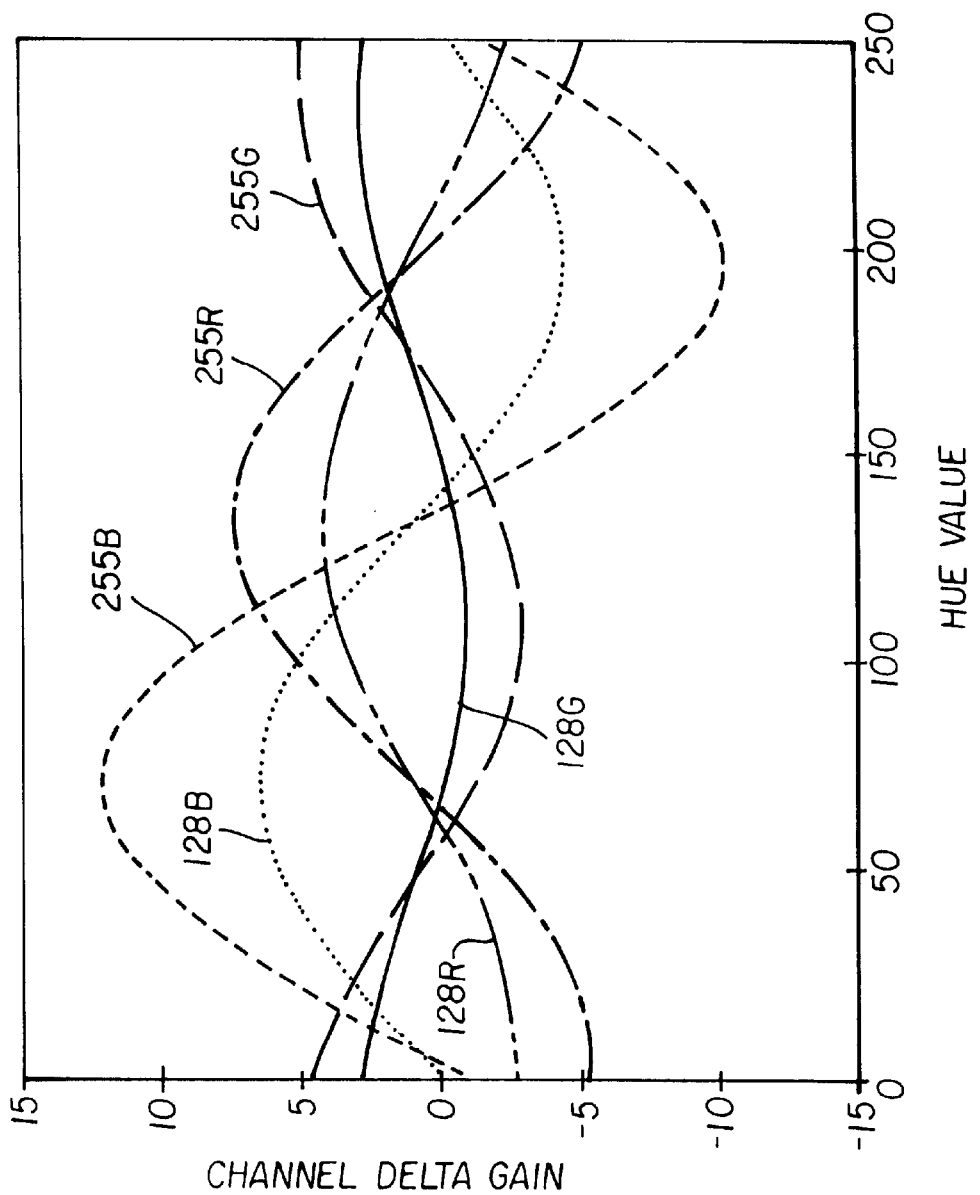
FIG. 3 is a graph illustrating color delta gains as modified by hue angle.

In one example, instead of using the normal combinations of red, green and blue specified in the Y, Cr, Cb color space, to achieve the affect of a yellow filter, the invention reduces or applies a zero value to the blue (Cb) channel. The Y, Cr, Cb color space is then converted back to RGB using the standard inverse RGB to Y, Cr, Cb matrix. The result is an image with a luminance channel with little or no blue response causing the blue regions of the image (i.e. sky) to become darker. Therefore, the invention achieves the same result of darkening the sky, without using a yellow filter. Thus, in color photography, the invention will not produce a yellow color cast across the image because the invention does not actually use a yellow filter. To the contrary, the invention merely reduces the blue response in the luminance signal, allowing the blue sky to become darker. FIG. 3 includes graphs of channel delta gains as hue values change for Sat 128 red, green, and blue as well as Sat 255 red, green, and blue. Notice that the blue coefficient is modified by a negative value. This means that the blue data is subtracted from the green and red channels when creating the luminance channel.

This aspect of the invention is particularly useful with systems which recognize outdoor photographs. For example, by noting the auto-exposure EV value, auto focus distance and auto white balance factors when the image was taken, it is well known to one ordinarily skilled in the art how to determine if a scene is an outdoor landscape. For example, when the EV is above some threshold, auto-focus is set at infinity and/or the white balance factors are some small Euclidean distance from a daylight white balance, the image is most likely an outdoor image. With such an image, the present inventive filter could be used to reduce haze and darken the sky, without an undesirable yellow color cast. Similarly, other situations where scene segmentation is determined can suggest an appropriate filter. For example, foliage can be made preferentially darker using an orange or red filter, or lighter using a green filter. Red filters have been used to reduce the appearance of blemishes in portrait photography, while the use of a green filter can increase facial texture.

A more specific example of the processing used by the invention in the creation of the color filter 24 is shown below. The following assumes the two controls (Sat and Hue) are mapped on the numerical range of 0–1. These two signals will be used to create a new luminance channel in the matrix (item 23) that converts RGB to Y, Cr, Cb as follows:

$$u = 4 \cdot Sat \cdot \left( \cos(2 \cdot \pi \cdot Hue) + \sin(2 \cdot \pi \cdot Hue) + \frac{1}{2} \right)$$

$$v = 4 \cdot Sat \cdot \left( \cos(2 \cdot \pi \cdot Hue) - \sin(2 \cdot \pi \cdot Hue) - \frac{1}{2} \right)$$

Letting MRGBToYCrCb be the matrix that converts the RGB color space to Y, Cr, Cb color space, given the factors u and v, an RGB filter can be defined as follows:

$$\begin{bmatrix} RFilter \\ GFilter \\ BFilter \end{bmatrix} = [MRGBToYCrCb] \cdot \begin{bmatrix} l \\ u \\ v \end{bmatrix}$$

These filter values can then be used to modify the weights used to calculate the luminance channel (the first row of the MRGBtoYCrCb matrix).

$$\begin{bmatrix} NewMRGBToYCrCb_{0,0} \\ NewMRGBToYCrCb_{0,1} \\ NewMRGBToYCrCb_{0,2} \end{bmatrix} = \begin{bmatrix} RFilter \cdot MRGBToYCrCb_{0,0} \\ GFilter \cdot MRGBToYCrCb_{0,1} \\ BFilter \cdot MRGBToYCrCb_{0,2} \end{bmatrix}$$

The invention then multiplies the log space values by the NewMRGBToYCrCb matrix (item 22) and then by the inverse of the MRGBToYCrCb matrix (item 25) to provide the new values with the image luminance filtered by the RGB filter values (item 26).

$$\begin{bmatrix} LogFilteredR \\ LogFilteredG \\ LogFilteredB \end{bmatrix} = MRGBToYCrCb^{-1} \cdot NewMRGToYCrCb \cdot \begin{bmatrix} \log(R) \\ \log(G) \\ \log(B) \end{bmatrix}$$

$$\begin{bmatrix} FilteredR \\ FilteredG \\ FilteredB \end{bmatrix} = \begin{bmatrix} 10^{LogFilteredR} \\ 10^{LogFilteredG} \\ 10^{LogFilteredB} \end{bmatrix}$$

Figure 4:
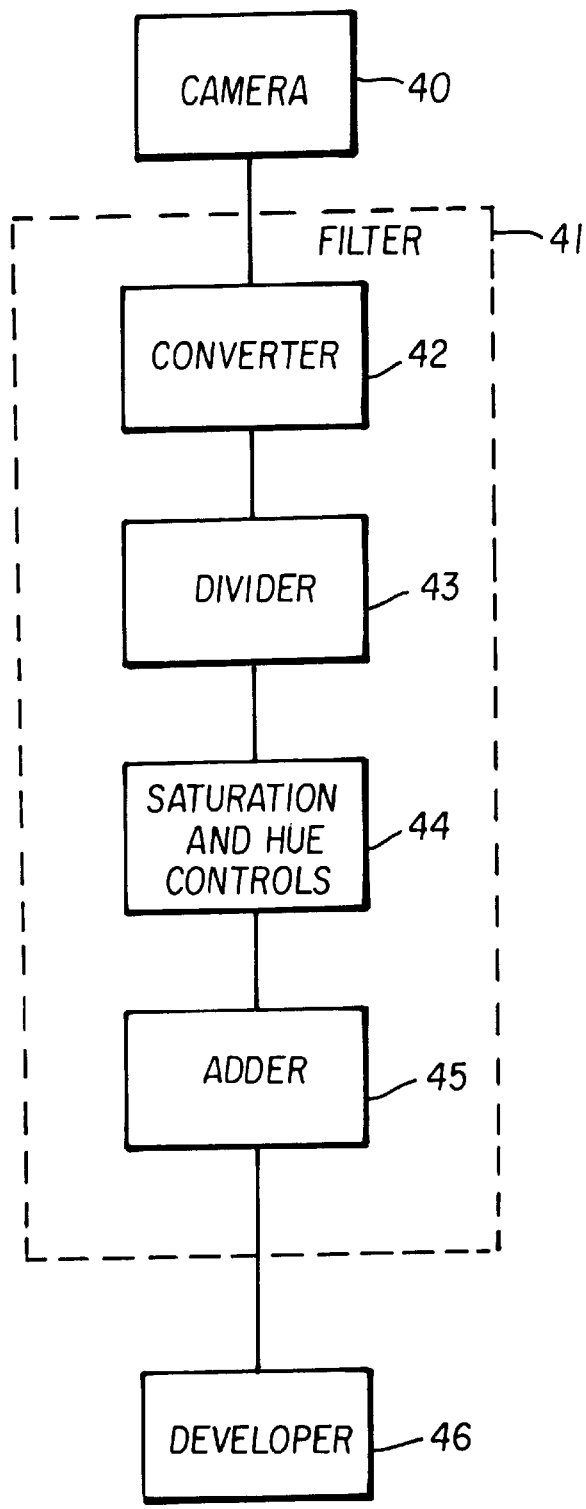
FIG. 4 is a schematic diagram of a system embodiment of the invention.

FIG. 4 illustrates a system embodiment of the invention. In FIG. 4, a camera 40 captures an image that is filtered by the filter 41 and developed by the developer 46. The filter also includes a converter 42 for converting the image into a linear exposure and into logarithmic YCrCb space. The converter 42 allows the luminance channel to be altered independently from the chrominance channels. The filter includes a divider 43 that separates the image into the luminance channel and chrominance channels. Saturation and hue controls 44 alter the luminance channel and an adder 45 recombines the chrominance channels and the altered luminance channel to output the filtered image to the developer 46.

The saturation and hue controls 44 produce a filtered RGB to YCrCb matrix and apply the matrix to the logarithmic space to produce a filtered logarithmic space. The adder 45 applies a YCrCb to RGB matrix to the filtered logarithmic space.

Figure 5:
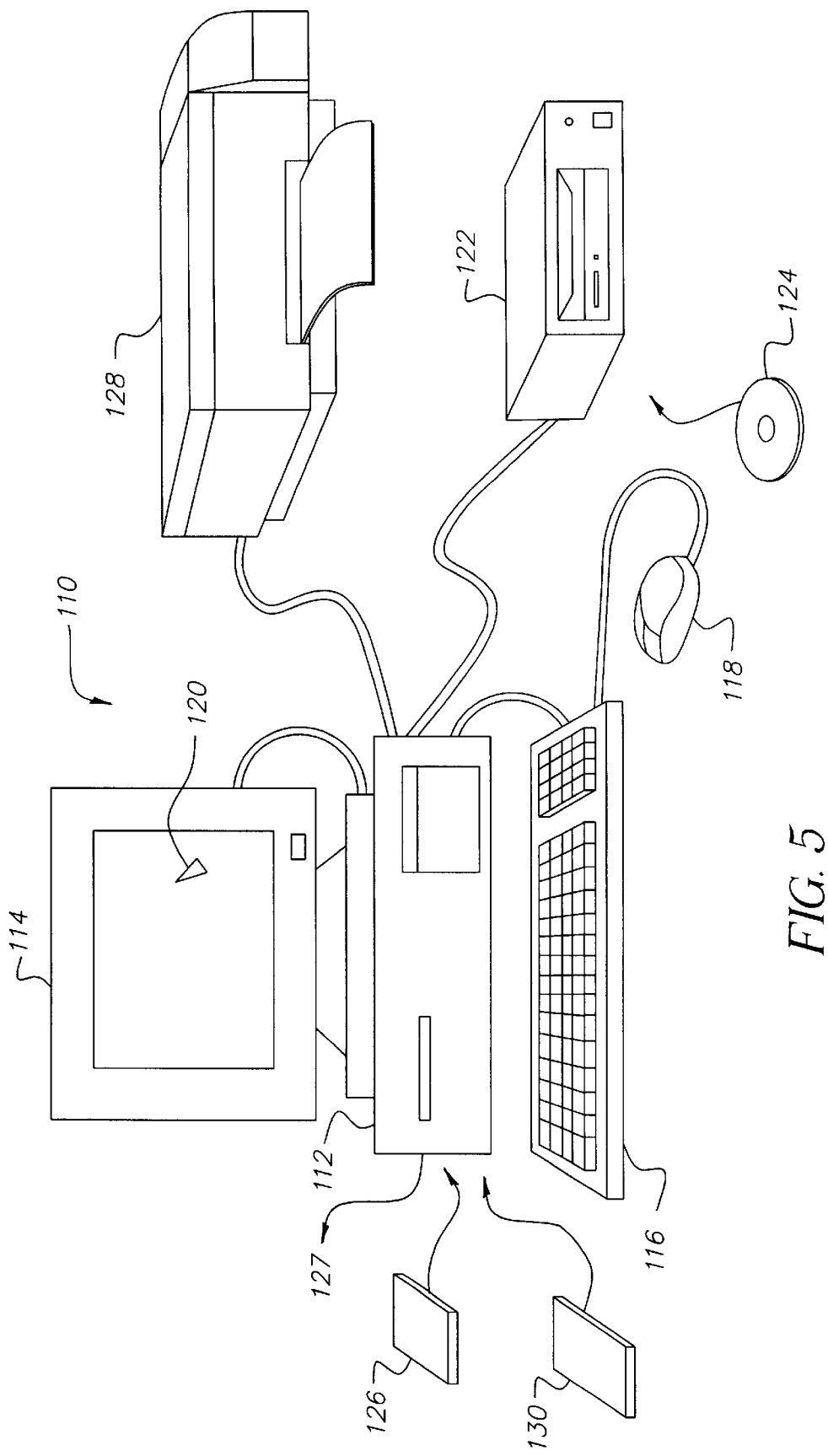
FIG. 5 is a schematic diagram of a computer system embodiment of the invention.

Referring to FIG. 5, there is illustrated a computer system 110 for implementing the present invention. Although the computer system 110 is shown for the purpose of illustrating a preferred embodiment, the present invention is not limited to the computer system 110 shown, but may be used on any electronic processing system that produces images, such as digital printing systems. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In accordance with the invention, this software program could include the contrast prediction application described herein, as well as programs that utilize its output, such as the automatic image compression program. In addition, a floppy disk 126 may also include the software program, and be inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. The program could thus be stored on a remote server and accessed therefrom, or downloaded as needed. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown).

The invention can be very well applied in a digital printing systems by processing images to predict and adjust contrast. It is suitable also for projecting images on the screen using digital projectors.

Some images have too little contrast or are unrenderable due to too much image contrast. Detecting this and applying the correct color filter can be used to increase contrast that is too low, or to decrease contrast that is too high. For example, typically, the blue channel has a lower dynamic range than other color channels. In a scene where the dynamic range of the capture exceeds the ability to render the image, the invention can decrease the dynamic range to make the entire dynamic range of the image renderable. Going back to the example of the image with blue sky. By creating a luminance channel where blue is subtracted reduces the dynamic range of the signal. On the other hand, an underwater scene may lack image contrast, and the invention uses a red filter to bring out detail not found in the original scene. The red filter would enhance red objects that may have been lost from the blue-green water.

A filter applied to enhance one region of image, may cause undesired results when applied to other regions containing different chromaticities. The inventive filter can be made to change its response based upon the color of the pixel, the location of a pixel in an image, or results from other image analysis/image understanding algorithms.

This invention can be deployed in an image processing software package where the user can manipulate the controls for a desired output. Further, it can be deployed in a digital camera where a mode setting, object recognition, or a determination of capture parameters such as white balance settings, focal length, focal distance and exposure value would indicate the subject as being a landscape or portrait for example. Where landscapes tend to be acquired with a high exposure value, daylight white balance settings, focused at infinity with focal length consistent with a wide angle perspective. Portraits tend to be taken with an normal or slightly telephoto focal length and a focal distance of less than 4 meters. The same heuristic could be applied in a photofinishing environment using meta-data encoded in the digital file or APS magnetic strip.

While the invention has been described in terms of preferred embodiments, those skilled in the art will recognize that the invention can be practiced with modification within the spirit and scope of the appended claims.

What is claimed is:

1. A method of filtering a photographic image comprising:
   separating said image into a luminance channel and chrominance channels;
   altering said luminance channel by modifying red, green and blue coefficients of said luminance channel to produce an altered luminance channel; and
   recombining said chrominance channels and said altered luminance channel.

2. The method in claim 1, wherein said altering of said luminance channel includes adjusting saturation and hue of said luminance channel.

3. The method in claim 2, wherein said hue controls a color of said luminance channel and said saturation controls a strength of said luminance channel.

4. The method in claim 1, further comprising before said separating, converting said image into a linear exposure.

5. The method in claim 4, further comprising converting said linear exposure to a logarithmic space.

6. The method in claim 5, wherein said converting of said linear exposure to said logarithmic space allows said luminance channel to be altered independently from said chrominance channels.

7. The method in claim 5, wherein said altering comprises creating a filtered RGB to YCrCb matrix and applying said matrix to said logarithmic space to produce a filtered logarithmic space.

8. The method in claim 7, wherein said recombining comprises applying a YCrCb to RGB matrix to said filtered logarithmic space.

9. A method of developing a photographic image comprising:

inputting an image from a camera;

filtering said image; and developing said image, wherein said filtering of said image comprises:

separating said image into a luminance channel and chrominance channels;

altering said luminance channel by controlling saturation and hue to produce an altered luminance channel; and recombining said chrominance channels and said altered luminance channel.

10. The method in claim 9, wherein said hue controls a color of said filtering and said saturation controls a strength of said filtering.

11. The method in claim 9, further comprising before said separating, converting said image into a linear exposure.

12. The method in claim 11, further comprising converting said linear exposure to a logarithmic space.

13. The method in claim 12, wherein said converting of said linear exposure to said logarithmic space allows said luminance channel to be altered independently from said chrominance channels.

14. The method in claim 12, wherein said altering comprises creating a filtered RGB to YCrCb matrix and applying said matrix to said logarithmic space to produce a filtered logarithmic space.

15. The method in claim 14, wherein said recombining comprises applying a YCrCb to RGB matrix to said filtered logarithmic space.

16. A method of filtering a photographic image comprising:

converting said image into a linear exposure;

converting said linear exposure to a logarithmic space;

separating said image into a luminance channel and a chrominance channels;

altering said luminance channel by controlling saturation and hue to produce an altered luminance channel, wherein said altering comprises creating a filtered RGB to YCrCb matrix and applying said matrix to said logarithmic space to produce a filtered logarithmic space; and recombining said chrominance channels and said altered luminance channel, wherein said recombining comprises applying a YCrCb to RGB matrix to said filtered logarithmic space.

17. The method in claim 16, wherein said hue controls a color of said filtering and said saturation controls a strength of said filtering.

18. The method in claim 16, wherein said converting of said linear exposure to said logarithmic space allows said luminance channel to be altered independently from said chrominance channels.

19. A system for developing a photographic image comprising a filter applied to said image, said filter comprising:

a divider adapted to separate said image into a luminance channel and chrominance channels;

a saturation control and a hue control adapted to alter said luminance channel and to produce an altered luminance channel; and an adder adapted to recombine said chromaniance channels and said altered luminance channel.

20. The method in claim 19, wherein said hue control changes a color of said filter and said saturation control changes a strength of said filter.

21. The method in claim 19, further comprising a converter adapted to convert said image into a linear exposure.

22. The method in claim 21, wherein said converter further converts said linear exposure to a logarithmic space.

23. The method in claim 22, wherein said converter allows said luminance channel to be altered independently from said chrominance channels.

24. The method in claim 22, wherein said saturation input and said hue input produce a filtered RGB to YCrCb matrix and apply said matrix to said logarithmic space to produce a filtered logarithmic space.

25. The method in claim 24, wherein said adder applies a YCrCb to RGB matrix to said filtered logarithmic space.

* * * * *